(12) United States Patent
Ayambem et al.

(10) Patent No.: US 10,767,129 B2
(45) Date of Patent: Sep. 8, 2020

(54) ASPHALT-BASED DUST CONTROL FORMULATIONS

(71) Applicant: Henry Company, LLC, El Segundo, PA (US)

(72) Inventors: Amba Ayambem, Glenmoore, PA (US); Daniel B. Kent, Phoenixville, PA (US); John C. Dobson, West Chester, PA (US)

(73) Assignee: Henry Company, LLC, El Segundo, CA (US)

( * ) Notice: Subject to any disclaimer, the term of this patent is extended or adjusted under 35 U.S.C. 154(b) by 124 days.

(21) Appl. No.: 15/421,550

(22) Filed: Feb. 1, 2017

(65) Prior Publication Data

US 2017/0218289 A1 Aug. 3, 2017

Related U.S. Application Data

(60) Provisional application No. 62/289,732, filed on Feb. 1, 2016.

(51) Int. Cl.
| | |
|---|---|
| *C10L 5/24* | (2006.01) |
| *C04B 24/36* | (2006.01) |
| *C09C 1/56* | (2006.01) |
| *C09C 3/10* | (2006.01) |
| *C09C 1/02* | (2006.01) |
| *C09K 3/22* | (2006.01) |
| *C04B 22/00* | (2006.01) |
| *C10L 5/02* | (2006.01) |
| *C10L 5/32* | (2006.01) |
| *C04B 103/00* | (2006.01) |

(52) U.S. Cl.
CPC ............ *C10L 5/24* (2013.01); *C04B 22/0093* (2013.01); *C04B 24/36* (2013.01); *C09C 1/021* (2013.01); *C09C 1/56* (2013.01); *C09C 3/10* (2013.01); *C09K 3/22* (2013.01); *C10L 5/02* (2013.01); *C10L 5/32* (2013.01); *C04B 2103/0075* (2013.01); *C10L 2230/08* (2013.01); *C10L 2230/14* (2013.01); *C10L 2250/08* (2013.01); *C10L 2290/18* (2013.01)

(58) Field of Classification Search
CPC combination set(s) only.
See application file for complete search history.

(56) References Cited

U.S. PATENT DOCUMENTS

| | | | |
|---|---|---|---|
| 6,291,006 B1 * | 9/2001 | Butterbaugh | ............. A23F 3/32 426/285 |
| 2005/0009962 A1 * | 1/2005 | Desin | ................... C08K 5/0008 524/60 |
| 2008/0087305 A1 * | 4/2008 | Cotter | .................... B08B 17/00 134/42 |
| 2015/0158999 A1 | 6/2015 | Ayambem et al. | |

FOREIGN PATENT DOCUMENTS

| | | |
|---|---|---|
| JP | 11343746 A | 12/1999 |
| WO | WO2010091326 A2 | 8/2010 |
| WO | WO2015076945 A1 | 5/2015 |

* cited by examiner

*Primary Examiner* — Ellen M Mcavoy
*Assistant Examiner* — Chantel L Graham
(74) *Attorney, Agent, or Firm* — BakerHostetler (57) ABSTRACT

This disclosure describes formulations and methods for dust control, for example, coal topping, a term which refers to the application of liquid products to the top of coal loads, such as those in open topped coal hopper railcars as commonly used today to transport coal. Disclosed herein are asphalt-based emulsion formulations that accomplish dust control during industrial operations in which dust handling is required.

20 Claims, 2 Drawing Sheets

ASPHALT-BASED DUST CONTROL FORMULATIONS

CROSS REFERENCE TO RELATED APPLICATIONS

This application claims benefit of U.S. Provisional Application 62/289,732, filed Feb. 1, 2016, the contents of which are incorporated herein by reference.

TECHNICAL FIELD

The present invention relates to dust control compositions. More specifically, the invention is directed to dust-inhibiting concentrates and other solutions containing asphalt emulsions. This disclosure describes formulations and methods for dust control, for example, coal topping, a term which refers to the application of liquid products to the top of coal loads, such as those in open topped coal hopper railcars as commonly used today to transport coal. Disclosed herein are asphalt-based emulsion formulations that accomplish dust control during industrial operations in which dust handling is required.

BACKGROUND

Many industrial operations create fugitive dust. Because it can be airborne, fugitive dust is an environmental and a health hazard and in some cases, even a fire hazard. Airborne dust can also mean loss of usable material. Also, the airborne particles are highly pervasive and can enter the nose, lungs, eyes and even the pores of the skin. Industrial operations requiring dust prevention include dumping of material, transportation, transfer point operation, stockpiling, storage, reclaiming, conveyoring, shearing, continuous mining, crushing, screening and sifting, drying, packaging and filling.

All types of dust including soil particles, industrial products, by-products and waste, coal dust, road dust and many others present hazards. Some examples of particulate materials that produce dust include for example, ground limestone (10 to 1000 $\mu m$); fly ash (10 to 200 $\mu m$); coal dust (1 to 100 $\mu m$); cement dust (3 to 100 $\mu m$); carbon black (0.01 to 0.3 $\mu m$); and pulverized coal (3 to 500 $\mu m$).

For example, the high speed transportation of coal by rail may cause loss of fine coal particles. In fact, coal trains are known as "black snakes." The name aptly describes the miles of uncovered rail cars bearing the black cargo as they slither along the tracks. During the journey from coal mines to their final destinations, coal trains shed plumes of coal dust from the tops of the train cars. As the dust spews from the rail cars, it fills the surrounding air with harmful substances such mercury, lead, cadmium, arsenic, manganese, beryllium, and chromium. When the dust settles, these substances are deposited in soil and water, harming plant, animal, and marine life.

Both train vibration and airspeed (from wind or due to the speed of train) can lift particles from exposed coal making them airborne and depositing them along the right-of-way and transporting them by wind considerable distances. In addition to environmental hazards, health hazards and product loss, coal dust lost during transportation can also damage transportation infrastructure. Environmental consequences from coal dust are also rooted in railroad safety concerns. Coal dust accumulation in the ballast can destabilize the tracks and contribute to derailments. Derailments impact the environment because the overturned train can spill locomotive fuel and dump thousands of pounds of coal and coal dust, resulting in soil and water contamination.

Fugitive dust problem avails itself to two solutions: (1) lowered dust creation; and (2) dust control through prevention, suppression, capture, or removal.

This invention relates to the second solution, that is, dust control. Dust control can be approached in four ways: (1) using wet systems that use water sprays to prevent dust or capture airborne dust; (2) using enclosures to contain dust; (3) using ventilation systems/exhaust systems to remove dust; (4) using a combination of these techniques. More specifically, this invention relates to novel asphalt-based emulsion formulations in wet spray systems that can assist in dust control.

Halide brines, comprising one or more dissolved or suspended salts in water, usually halide salts, especially chloride salts, particularly calcium chloride, magnesium chloride and other alkali metal and alkaline earth metal salts, are used extensively for inhibiting dust on a variety of surfaces including such uses as dust control of roadways, paved areas, bridges and the like as well as for inhibiting dust on surfaces of bulk materials, such as coal, coke, limestone and minerals. They are also used for dust control, especially during dry weather during the handling and transportation of dust-producing bulk materials, such as coal, coke and limestone.

Aqueous solutions of these halides are known to corrode metals and cause scaling or surface damage to concrete. For example, heavy use of road deicers can result in serious damage to steel, particularly autos and other vehicles, as well as rapid deterioration of steel reinforcing rods in poured concrete roadways and bridges. The halides used for dust control of bulk materials such as coal or other minerals often cause corrosive deterioration of the materials-handling equipment, rail cars and other container carriers.

In accordance with the present invention, it has been found that in one embodiment, a formulation comprising asphalt emulsions resists absorption into pores of coal and other mineral surfaces, including soil, so that after drying into a continuous or discontinuous film, the asphalt emulsion will provide later dust control, as well as exhibiting dust control and anti-corrosion properties upon later wetting with water.

The composition of the present invention addresses the above discussed problems of dust generation. The emulsion of the present invention comprising asphalt-based emulsion can be added to a water based spray system that can then be used for spraying on to the particulate material, for example, coal, to control the dust.

SUMMARY

The following presents a simplified summary of one or more aspects in order to provide a basic understanding of such aspects. This summary is not an extensive overview of all contemplated aspects, and is in-tended to neither identify key or critical elements of all aspects nor delineate the scope of any or all aspects. Its sole purpose is to present some concepts of one or more aspects in a simplified form as a prelude to the more detailed description that is presented later.

More specifically, the present invention provides a dust control formulation ("DCF") that includes a dust reducing or control additive ("DCA"). Generally, the DCF includes a sufficient amount of the dust control additive so that when the DCF is tested as described in this specification, it generates a lower quantity of airborne dust than DCF would produce if it did not contain the dust control additive.

Disclosed herein are embodiments of a low-dust DCF that comprises water and dust reducing additive, which is an asphalt emulsion comprising asphalt, preferably, an asphalt blend. The DCA can be pre-mixed into the wet DCF prior to application. Generally, the dust reducing additive reduces the quantity of airborne dust particles having a size of less than or equal to 10 microns to less than 50% of the quantity that would be generated without the additive. In certain embodiments, the quantity of airborne dust particles is reduced by at least 75% compared to a mixture without the additive. It is desirable that the dust control additive serve to suppress the formation of airborne particles without significantly interfering with the desired characteristics of the DCF. The present invention in fact discloses a DCF that has a synergistic combination of improved dust control property, improved water resistance, and improved adhesive property.

In one embodiment, the DCF can include a conventional filler material and a binder material, such as a resin. The DCF can also include a surfactant, which may or may not serve to suppress airborne dust formation, and optionally a thickening agent. Prior to hardening, the DCF preferably includes a sufficient amount of water to form a mud-like spreadable material which can be applied to the substrate surface. In some embodiments, the DCF can comprise the dust control additive emulsion and can have a contact angle of about 90 to about 130 degrees, a pH below 12, and a Cobb value of about 1.0 to about 1000 grams per square meter.

In some embodiments, the DCF can further comprise a rheology modifier, a binder, a thickener, and filler. In some embodiments, the DCF can further comprise calcium carbonate, or cristobalite, or a micro-roughened filler, or gypsum, or mica, or clay, or thickener, or a latex binder, or talc, or perlite, or expanded perlite, or combinations thereof. In some embodiments, the DCF can comprise the asphalt emulsion which can comprise water, low CVS emulsifier, and a first defoamer. The low CVS emulsifier comprises of water, optionally a disper-sant such as tetrasodium pyrophosphate, optionally an emulsifier fatty acid solution such as Vinsol® (Abietic Acid), a Second Defoamer, a Base and a Suspension Agent Such as Clay Slurry.

In some embodiments, the DCF reduces reduction of peak airborne dust production from about 10% to about 98% compared to the commercially available DCF dust control additive.

In some embodiments, the DCF can have a pH below 9. In some embodiments, the DCF can have a contact angle of about 60 to about 130 degrees. In some embodiments, the DCF can be generally hydrophobic and can have a contact angle of about 110 to about 130 degrees. In some embodiments, the DCF can have a Cobb value of about 1.0 to about 1000 (g)/m2. In some embodiments, the DCF can have a Cobb value of about 65 (g)/m2.

In some embodiments, the DCF can further comprise a rheology modifier, a binder, a thickener, and a filler. In some embodiments, the DCF can further comprise calcium carbonate, or cristobalite, or a micro-roughened filler, or gypsum, or mica, or clay, or thickener, or a latex binder, or talc, or perlite, or expanded perlite, or combinations thereof.

In some embodiments, the DCF can comprise asphalt blend, water, clay, phosphoric acid, preservative, and a filler such as wollastonite.

In one embodiment, the present invention relates to a method for controlling dust on a surface of a bulk material, comprising:

(I) preparing a dust control formulation (DCF) comprising a dust reduction additive (DRA) emulsion comprising asphalt; and (II) applying said dust control formulation to said surface of said bulk material in an amount effective for dust control.

In another embodiment, the present invention relates to the method described above, wherein said dust control formulation is applied by sprinkling, and/or a spray nozzle.

In another embodiment, the present invention relates to the methods described above, wherein said dust control formulation further comprises a first water.

In yet another embodiment, the present invention relates to the methods described above, wherein said DRA emulsion comprising asphalt further comprises:

(A) at least one defoamer; and
(B) at least one emulsifier.

In one embodiment, the present invention relates to the methods described above, wherein said asphalt in said DRA is from about 30% to about 70% by weight of the DRA.

In another embodiment, the present invention relates to the methods described above, wherein said asphalt in said DRA is from about 30% to about 70% by weight of the DRA; wherein said at least one defoamer in said DRA is from about 0.00005% to about 0.00030% by weight of the DRA; and wherein said at least one emulsifier in said DRA is from about 30% to about 70% by weight of the DRA.

In yet another embodiment, the present invention relates to the methods described above, wherein said at least emulsifier is a low-fatty acid emulsifier; comprising water; a fatty acid solution; a base; and optionally comprising a dispersant; optionally comprising a stabilizer; optionally comprising a defoamer; and optionally comprising a suspension agent.

In one embodiment, the present invention relates to the methods described above, wherein said suspension agent is a clay slurry.

In another embodiment, the present invention relates to the methods described above, wherein said asphalt in said DRA is an asphalt blend.

In yet another embodiment, the present invention relates to the methods described above, wherein said DCF further comprises a binder; a preservative; a rheology modifier; and/or a surfactant.

In one embodiment, the present invention relates to the methods described above, wherein said dust-reduction additive emulsion further comprises a second water; a base; and a dispersant.

In another embodiment, the present invention relates to the methods described above, wherein the weight of said dust reduction additive emulsion is in the range of from about 0.01% to about 20% by weight of said dust control formulation.

In a further embodiment, this invention relates to methods described previously, wherein the weight of said dust reduction additive emulsion is in the range of from about 0.1% to about 10% by weight of said dust control formulation.

In one embodiment, this invention relates to methods described previously, wherein said dust control formulation is applied to the surface of said bulk material at the rate of from about 0.001 to about 5.0 gallon per square yard for controlling dust.

In another embodiment, this invention relates to methods described previously, wherein said bulk material is coal, limestone, fly ash, cement, carbon black, coke, or mineral material.

In yet another embodiment, this invention relates to methods described previously, wherein said bulk material is coal, and said dust control formulation is applied the top of said coal load in an open-topped, coal-hopper railcar, used for transporting coal.

Finally, this invention also relates to a concentrated dust control formulation, suitable for dust control upon dilution with water consisting essentially of water and about 5-80% weight of dust control additive emulsion comprising asphalt.

BRIEF DESCRIPTION OF THE DRAWINGS

The disclosed aspects will hereinafter be described in conjunction with the appended Drawings, provided to illustrate and not to limit the disclosed aspects, wherein like designations denote the elements.

DETAILED DESCRIPTION OF ILLUSTRATIVE EMBODIMENTS

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Typical surfaces that require treatment for exposure to dust-yielding conditions are mineral, e.g., coal mines, coal, coke or limestone being transported by rail car, roadways, pavements, paved and unpaved open areas such as stock yards, bridges and the like. Coal, coke, limestone and other minerals may also produce dust that must be contained so as to limit pollution of the environment. Automobiles, metal rods used in construction of roads and bridges and the steel and metal components associated with the railways and other materials-handling equipment benefit from the corrosion-inhibiting feature of asphalt emulsion during treatments for dust control.

In accordance with a preferred embodiment of the methods described herein, the solution of asphalt emulsion in water is used to bind dust particles to larger particles, particularly on mineral, e.g., coal, mine floors and on coal during transport via uncovered rail cars. On mineral mine floors and as a surface covering for coal and other dust-producing minerals being transported in uncovered rail cars, the asphalt emulsion preferably has a concentration of about 4-8 wt. percent in water % to bind smaller mineral particles to larger mineral particles. The asphalt emulsion coating resists absorption of the solution into the pores of the larger mineral particles and resists water evaporation to maintain the binding capability of the asphalt emulsion for continued binding of smaller mineral particles to larger mineral particles, even during movement and settling during transport.

If repeated applications of the asphalt emulsion solution are needed, such as on a roadway surface during construction, the asphalt emulsion concentration increases with each application to maintain the soil surface damp for an unexpectedly long period of time, e.g., about four times or more as long as using water only. The asphalt emulsion compositions described herein can be applied as asphalt emulsion in water. Alternatively, the composition can be provided as a slurry containing asphalt emulsion.

In the method of dust control, the DCF is applied to a surface of the material requiring dust control. One preferred rate of application is from about 0.001 to 5.0 gallons of admixture per square yard of surface treated. Rates vary according to the surface receiving the application. With unpaved roads, for example, the rate of application can be adjusted within a preferred range of 0.1 to 1.5 gallon of blend to one square yard of road. Treatment rates of application for other surfaces are known in the art.

The admixture can be applied to the surfaces of roads, bridges or bulk substances carried in open containers by any of several methods known in the art. One preferred method is sprinkling of the admixture solution over the surface requiring freeze conditioning or dust control. Another preferred method is spraying the admixture by nozzles, preferably pressurized nozzles, so that the mechanical action of the spray provides complete coverage of the admixture into unpaved road surfaces, coal, coke, limestone, and the like. Other known methods can be used to apply the admixture.

General Embodiments

There are several constraints that apply to a dust control formulation such as coal-topper formulations. A tensile strength high enough to resist cracking when subjected to shocks and wind during transport is preferred. For the same reason, greater flexibility is also preferred. Due to the cost of water, a low water requirement is preferred. A relatively higher depth of penetration, which is directly related to the viscosity of the coal topper formulation, is preferred to bind as much coal mass at the surface as possible. Viscosity is related to the ability of the polymer fluid to penetrate the surface of the subject media. In particular coal particulates, which have different wetting properties than normal soil or rock particulate, will reject fluid with excessive viscosity while accepting lower viscosity fluid. It is speculated that a hydrophobic mechanism may play a part, possible a result of the hydrocarbon interaction with the coal topper. In addition, the coal topper formulation must not inhibit the ability to unload or burn the coal. A coal topper should not excessively corrode the transport equipment such as the railcars or loading/unloading equipment.

The dust control formulations of the present invention serve all of the above advantages. Embodiments of the present disclosure provide a dust control additive ("DCA") comprising asphalt emulsion. In another embodiment, the present invention relates to the process of preparing such dust control additive emulsions. Dust control additive refers to any ingredient capable of preventing, minimizing, suppressing, reducing, or inhibiting the formation of particles capable of becoming airborne. The expressions "airborne particles" or "airborne dust particles" refer to fine particles generated during the many industrial and/or other process operations such as dumping of material, transportation, transfer point operation, stockpiling, storage, reclaiming, conveyoring, shearing, continuous mining, crushing, screening and sifting, drying, packaging, filling, sanding and abrading While the disclosure infra describes the DCA of the present invention in the context of coal topping, the DCA emulsion can also be used with other particulate materials where airborne particles are generated.

The present invention also relates to dust control formulations comprising the dust control additive and methods for preparing such dust control formulations. By "dust control formulation" (DCF) is meant a formulation such as a spray comprising DCA emulsion which helps in control of airborne particles. According to the present invention, there are provided dust control formulations suitable for spraying and applying to particulate materials requiring dust control. The compositions of the present invention include a dust control additive combined with other ingredients to form an aqueous system, or a non-aqueous system including fillers, binders, and/or thickeners to form a DCF.

In addition to providing a dust control property, the DCF of the present invention may also be hydrophobic, and thus, water-resistant. Further, the embodiments of the present invention also provide adhesive properties to particulate material to which it is added.

The DCF may be used to create a low-dust, water resistant barrier over the materials on which it is sprayed thereby reducing the dust generated during process and preventing moisture from passing through the material. Further, the disclosed DCF formed from an asphalt emulsion can assist with adhesion.

The DCF can be used on various materials such as ground limestone (10 to 1000 µm); fly ash (10 to 200 µm); coal dust (1 to 100 µm); cement dust (3 to 100 µm); carbon black (0.01 to 0.3 µm); and pulverized coal (3 to 500 µm).

In accordance with a characterizing feature of the present invention, the DCF comprises the DCA emulsion which minimizes the quantity of airborne particles generated, for example, during operation of industrial processes. The DCA generally comprises less than 20% of the DCF wet weight. More preferably, the dust control additive comprises between about 0.1% and about 10% of the dust control formulation by wet weight percent and, most preferably, between about 1.5% and about 6%. In one embodiment, the DCA is selected from any one of the following weight percentages:

0.1, 1, 2, 3, 4, 5, 6, 7, 8, 9, 10, 11, 12, 13, 14, 15, 16, 17, 18, 19, and 20

The weight percentage of DCA emulsion in the DCF can be any number within the range defined by any two numbers above, including the endpoints. The dust control additive of the present invention is described in detail infra.

Many ingredients have been found to effectively reduce the quantity of airborne particles generated, including oils such as animal, vegetable, and mineral oils (saturated and unsaturated), and oils derived from petroleum, pitch, natural and synthetic asphalts, paraffins, solvents which evaporate slower than water, terpenes, glycols, surfactants, and mixtures thereof. However, the asphalt emulsion based DCA emulsion of the present invention unlocks the synergistic effect of the three desired properties in the DCF, namely, dust control property, water resistance, and adhesion. dust control additive may cause the dust particles to agglomerate or stick together, thereby forming large heavy particles which tend not to become or remain airborne.

Dust Control Additive

Definitions

For the purposes of this invention, an "asphalt blend" is a blend of various asphalt fractions from distillation of crude oil.

Asphalt Blend Compositions

Any suitable asphalt or asphalt cement may be employed for producing the modified asphalt blend compositions of the invention. For example, industrial asphalts used for coatings, sealants, roofing materials, adhesives, and other applications may be used. Paving grade asphalt compositions, however, are employed in the preferred embodiment of the invention. Asphalt compositions may be derived, as indicated, from any well-known bituminous or asphaltic substance obtained from natural sources or derived from a number of sources such as petroleum, shale oil, coal tar, and the like, as well as mixtures of two or more of such materials. Typical of such asphalts are the straight run asphalts derived from the atmospheric, steam and/or vacuum distillation of crude oils, or those asphalts derived from solvent precipitation treatments of raw lubricating oils and their fractions. Also included are the thermal or "cracked" asphalts which are separated as cracker bottom residues from refinery cracking operations and the asphalts produced as byproducts in hydrorefining operations. In one embodiment, the asphalt is the vacuum tower bottoms that is produced during the refining of synthetic or petroleum crude oils. For example, in one embodiment, any suitable paving grade asphalt may be employed for the compositions of the invention. Such paving grade asphalt compositions are often referred to as viscosity, penetration graded, or performance graded (PG) asphalts having penetrations up to 400 as measured by ASTM method D5.

In some embodiments, the asphalts are the performance graded asphalts such as PG 46-40, PG 46-34, PG 46-28, PG 52-40, PG 52-34, PG 52-28, PG 52-22, PG 58-40, PG 58-34, PG 58-28, PG 58-22, PG 64-40, PG 64-34, PG 64-28, PG 64-22, PG 70-40, PG 70-34, PG 70-28, PG 70-22, PG 76-40, PG 76-34, PG 76-28, PG 76-22, PG 82-34, PG 82-28, or PG 82-22.

The PG in the title refers to Performance Graded, the first numeric designation refers to the binder's high temperature rutting or deformation resistance temperature range limit, and the last numeric designation refers to the binder's low temperature thermal cracking resistance temperature limit. Complete specification requirements are outlined in specifications under AASHTO MP-1-93 Performance Graded Asphalt Binder Specification. AASHTO is the designation for the American Association of State and Highway Transportation Officials.

Dust Control Additive Asphalt Emulsion

Exemplary emulsion comprising asphalt emulsion for use in, for example, as a dust control additive (and for water-resistance) in a DCF are now described in greater detail, as follows.

In one embodiment, the asphalt emulsion comprises an asphalt blend, a defoamer, and a low fatty acid emulsifier. The components are mixed using standard procedures to make the asphalt emulsion.

The asphalt blend is as described previously. The asphalt content in the asphalt emulsion (the DCA) is from about 30% to about 70% of the total weight of the asphalt emulsion. Stated another way, the asphalt content in the asphalt emulsion DCA is 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 percent of the weight of the emulsion or the weight of the emulsion from a range defined by any two numbers and including the two numbers above.

The weight of the defoamer is from about 0.00005 to 0.00030% of the total weight of the asphalt emulsion. Stated another way, the defoamer content is 0.00005, 0.00006, 0.00007, 0.00008, 0.00009, 0.00010, 0.00011, 0.00012, 0.00013, 0.00014, 0.00015, 0.00016, 0.00017, 0.00018, 0.00019, 0.00020, 0.00020, 0.00021, 0.00022, 0.00023, 0.00024, 0.00025, 0.00026, 0.00027, 0.00028, 0.00029, or 0.00030 percent of the weight of the emulsion or the weight of the emulsion from a range defined by any two numbers and including the two numbers above.

The low fatty acid emulsifier (CVS emulsifier) is in the range of from about 30 to 70% of the total weight of the asphalt emulsion. Stated another way, the CVS emulsifier in the asphalt emulsion DCA is 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 percent of the weight of the emulsion or the weight of the emulsion from a range defined by any two numbers and including the two numbers above.

In all formulations described herein, optionally, a wetting agent such as polyethersiloxane can be added, for example in the range of from 0.05% to 1%.

The Low CVS Emulsifier

The low CVS emulsifier comprises water, optionally a dispersant that lowers the viscosity of the system such as tetrasodium pyrophosphate, optionally a stabilizer such as abietic acid (Vinsol®), optionally a defoamer, optionally a suspension agent such as clay slurry, and a base such as potassium hydroxide (KOH).

Preferably, the water content in the low CVS emulsifier is from 40 to 80%; the dispersant is from 0.05 to 0.3%; the fatty acid solution is from 10-25%; the defoamer is from 0.0001 to 0.005%; and the suspension agent such as a clay slurry in the range of 10% to 30%.

In one embodiment, the water content can be 40, 41, 42, . . . , 77, 78, 79, or 80%, or a number residing within a range defined by any two numbers inclusive of the two numbers given here. Similarly, the dispersant can be 0.05, 0.100, 0.150, 0.200, 0.250, or 0.300% or a number defined by and inclusive of any two numbers stated herein. Similarly, the fatty acid solution is 10, 11, 12, 13, 14, 15, 16, 17, 18, 19, 20, 21, 22, 23, 24, 25, 26, 27, 28, 29, and 30% of the weight of the CVS emulsifier. The defoamer can be 0.00010, 0.00050, 0.00100, 0.002, 0.003, 0.004, or 0.005 percent, or a number within a range defined by and inclusive of any two numbers herein. The clay slurry content is 10, 11, 12, 13, 14, 15, 16, 17, 18, 19, 20, 21, 22, 23, 24, 25, 26, 27, 28, 29, or 30 percent or a number within a range defined by and inclusive of any two numbers herein.

The components are mixed as a matter of standard procedure to make the CVS emulsion.

Clay Slurry

In one embodiment, clay slurry is used as a suspension, which contains from 80-95% water, 5-19% bentonite clay and 0.5 to 2% potassium oxalate.

In an alternative embodiment, the asphalt emulsion comprises from about 45-50% water; 35-45% asphalt blend; 2-6% bentonite clay; 0.02-0.07% phosphoric acid; 0.05 to 0.2% preservative; 0.1 to 1% wollastonite; and 5-12% of kaolin clay.

The clay slurry is formed as a result of using standard procedure to make the clay slurry.

In one embodiment, both asphalt emulsions described above are diluted to about 4% solution and then sprayed onto a coal rail car.

Figure 1:
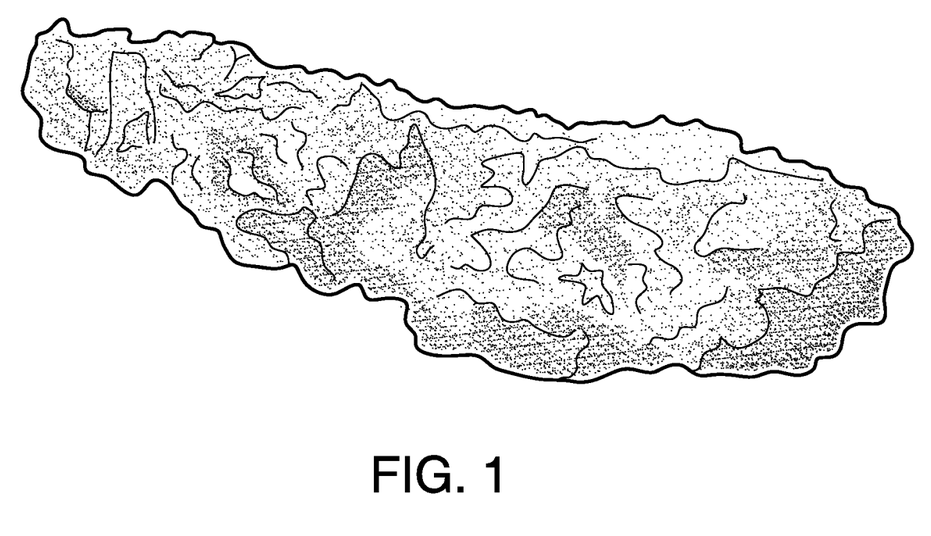
FIGS. 1 and 2 illustrate a "cake" formed as a result of asphalt emulsion based DCF spraying on the particulate coal.
Figure 2:
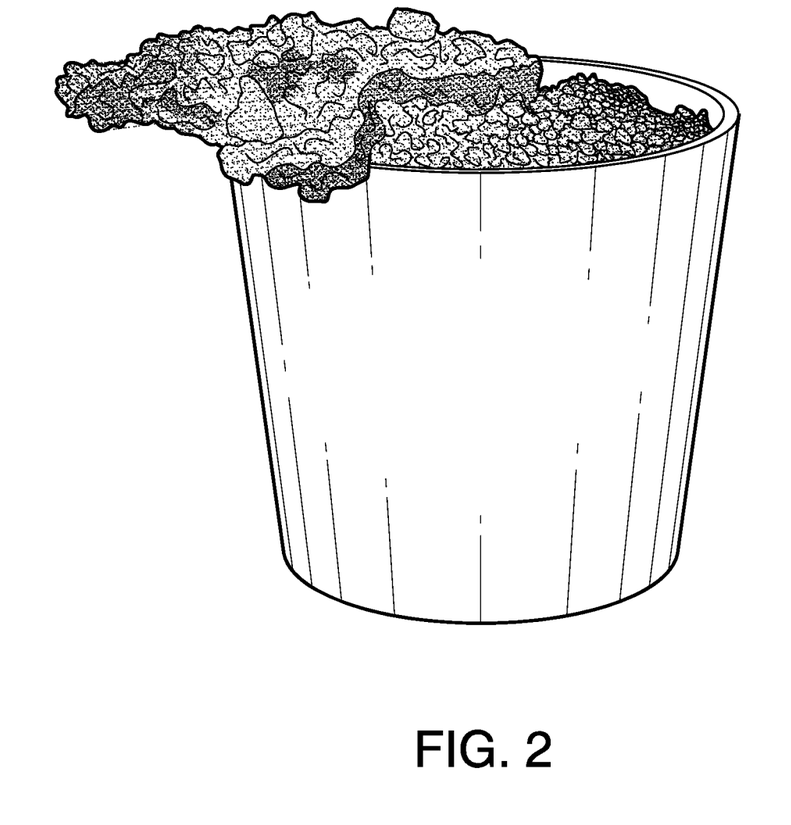

FIGS. 1 and 2 are photographs of the top cake formed as a result of spraying the asphalt emulsion dust reducing additive-comprising DCF. Upon spraying, a half-inch thick cake forms on the coal surface in the railcar, which protects the cola particles from getting airborne.

In some embodiments, a dispersant and/or a surfactant may be employed in the asphalt emulsions. Optional dispersants, include, but are not limited to those having a sulfur or a sulfur-containing group(s) in the compound such as sulfonic acids (R—S(═O)2-OH) and their salts, wherein the R groups may be otherwise functionalized with hydroxyl, carboxyl or other useful bonding groups. In some embodiments, higher molecular weight sulfonic acid compounds such as lignosulfonate, lignosulfonic acid, naphthalene sulfonic acid, the sulfonate salts of these acids and derivatized or functionalized versions of these materials are used in addition or instead. An example lignosulfonic acid salt is Polyfon® H available from MeadWestvaco Corporation, Charleston, S.C. Other dispersants may be used, such as magnesium sulfate, polycarboxylate technology, ammonium hepta molybdate/starch combinations, non-ionic surfactants, ionic surfactants, zwitterionic surfactants and mixtures thereof, alkyl quaternary ammonium montmorillonite clay, etc. Similar materials may also be used, where such materials may be compatible with and perform well with the formulation components.

In one embodiment, a dispersant and/or surfactant may comprise about 0.01% to about 5.0% by weight of the asphalt emulsion formulation composition, preferably about 0.1% to about 2.0% by weight of the asphalt emulsion formulation composition. Other concentrations may be used.

In some embodiments, the stabilizer comprises a polymer that is capable of hydrogen bonding to the carboxylate or similar moieties at the water/paraffin interface. Polymers that fit the hydrogen-bonding requirement would have such groups as hydroxyl, amine, and/or thiol, amongst others, along the polymer chain. Reducing the polymer's affinity for water (and thus, its water solubility) could be achieved by inserting hydrophobic groups such as alkyl, alkoxy silanes, or alkyl halide groups into the polymer chain. The result may be a polymer such as ethylene-vinyl acetate-vinyl alcohol terpolymer (where the vinyl acetate has been substantially hydrolyzed). The vinyl acetate content may be between 0% to 15%. In some embodiments, the vinyl acetate content is between 0% and 3% of the terpolymer chain. The ethylene-vinyl alcohol-vinyl acetate terpolymer may be included in the emulsion in an amount of up to about 10.0% by weight, preferably 0.1% to about 5.0% by weight of the emulsion. In some embodiments, ethylene-vinyl alcohol-vinyl acetate terpolymer may be included in the emulsion in an amount of about 2% to about 3% by weight of the asphalt emulsion. An example ethylene-vinyl alcohol-vinyl acetate terpolymer that is available is the Exceval AQ4104™, available from Kuraray Chemical Company.

The dust control additive asphalt emulsion may include a stabilizer material (e.g., PVOH, ethylene-vinyl alcohol-vinyl acetate terpolymer as described above). The stabilizer may be soluble in water at elevated temperatures similar to those disclosed with reference to PVOH (e.g., about 60° C. up to about 95° C.), but insoluble in cold water. The active species in the asphalt component (e.g., montan asphalt) may be the carboxylic acids and esters, which may comprise as much as 90% of the asphalt. These chemical groups may be converted into carboxylate moieties upon hydrolysis in a high pH environment (e.g., in an environment including aqueous KOH). The carboxylate moieties may act as a hydrophilic portion or "head" of the molecule. The hydrophilic portions can directly interface with the surrounding aqueous environment, while the rest of the molecule, which may be a lipophilic portion or "tail", may be embedded in the hydrocarbon asphalt.

In some embodiments, the asphalt emulsion comprises a base. For example, the emulsion may comprise an alkali metal hydroxide, such as potassium hydroxide or other suitable metallic hydroxide, such as aluminum, barium, calcium, lithium, magnesium, sodium and/or zinc hydroxide. These materials may serve as saponifying agents. Non-metallic bases such as derivatives of ammonia as well as amines (e.g., diethanolamine or triethanolamine) can also be used. Combinations of the above-mentioned materials are also possible. If included in the asphalt emulsion, potassium hydroxide is preferably present in an amount of 0% to 1%, more preferably about 0.1% to about 0.5% by weight of the asphalt emulsion.

The asphalt emulsion may further include other additives, including without limitation additional emulsifiers and stabilizers typically used in asphalt emulsions, flame retardants, lignocellulosic preserving agents, fungicides, insecticides, biocides, asphalts, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the asphalt emulsion.

The asphalt emulsion may be prepared using any acceptable techniques known in the art or to be developed for formulating asphalt emulsions.

Some or all steps of the above method may be performed in open vessels. However, the homogenizer may use pressure in its application.

Advantageously in some embodiments, the emulsion, once formed, is cooled quickly. By cooling the emulsion quickly, agglomeration and coalescence of the asphalt particles may be avoided.

In some embodiments the clay slurry and the CVS emulsifier are combined in a pre-mix tank. In other embodiments, the clay slurry and the other CVS emulsifier components may be combined for the first time in a homogenizer. Then this emulsifier is combined to form asphalt emulsion, or the dust reduction additive.

Dust Control Formulation

Embodiments of the disclosed asphalt emulsion based dust control additive emulsion can be used to form a dust control formulation (DCF). The DCF can be used to top coal-carrying railcars. It can also be used in various industrial operations to control the dust formation, for example, in all coal processes such as size reduction.

In one embodiment, an appropriately prepared formulation is sprayed over the coal, which penetrates the materials and binds the particles that could otherwise be airborne. The DCF can also be specially formulated to serve as a cover coat on in storage facilities such as silos and bins and other containers. The DCF can be particularly useful in locations where there is high humidity. The weight range of asphalt emulsion in the DCF ranges from 1% to 10% of the DCF.

The DCF can comprise a filler material. Any conventional filler material can be used in the present invention. Suitable fillers include calcium carbonate (CaCO3) and calcium sulfate dihydrate (CaSO4 2H2O commonly referred to as gypsum) for ready mixed type DCFs, and calcium sulfate hemihydrates (CaSO4-1/2H2O) for setting type DCFs. The DCF can also include one or more secondary fillers such as glass micro bubbles, mica, perlite, talc, limestone, pyrophyllite, silica, and diatomaceous earth. The filler generally comprises from about 1% to about 95% of the weight of the DCF based on the total wet weight of the formulation (i.e. including water). Another ingredient usually present in DCF is a binder or resin. Suitable binders include polyvinyl acetate, polyvinyl alcohol, ethylene vinyl acetate co-polymer, vinylacrylic co-polymer, styrenebutadiene, polyacrylamide, other acrylic polymers, other latex emulsions, natural and synthetic starch, and casein. These binders can be used alone or in combination with one another. The amount of binder can range from about 1% to about 45% of the DCF total wet weight. More preferably, the binder comprises from about 1% to about 20% of the total wet weight, and most preferably, from about 4% to about 14%.

A surfactant can also be included in the DCF formulation. The surfactant generally comprises less than about 3.5% of the DCF total wet weight, and preferably less than about 0.25%.

Many DCF formulations also contain a cellulosic thickener, usually a cellulosic ether. Suitable thickeners include methyl cellulose, hydroxypropyl cellulose, hydroxypropyl methyl cellulose, hydroxyethyl cellulose, hydroxyethyl methyl cellulose, hydroxyethyl hydroxypropyl cellulose, ethylhydroxyethyl cellulose, and sodium carboxymethyl cellulose (CMC). These thickeners can be used alone or in combination with one another. The amount of cellulosic thickener can range from about 0.1% to about 2% by weight of the DCF. A preferred thickener is hydroxypropyl methyl cellulose available from Dow Chemical Company under the trade designation Methocel.

Another ingredient that can be included in the DCF of the invention is a non-leveling agent. Suitable non-leveling agents include clays such as attapulgus clay, bentonite, illite, kaolin and sepiolite, and clays mixed with starches. Thickeners, such as those described above, can also function as non-leveling agents.

Additional ingredients which can be utilized in the DCF are preservatives, fungicides, anti-freeze wetting agents, defoamers, flocculants, such as polyacrylamide resin, and plasticizers, such as dipropylene glycol dibenzoate.

In some embodiments, perlite can be used in a DCF to, for example, control the density, shrinkage, and crack resistance of the DCF. In some embodiments, perlite need not be used (e.g., where weight is not as much of a factor).

In some embodiments, clay can be used in a DCF as, for example, a non-leveling agent and/or a thickening agent that can control the viscosity or rheology of the final product. Clay can also help enhance or create the water-holding properties of the DCF.

In some embodiments, thickeners can be used to control the viscosity, affect the rheology, and affect the water holding characteristics of a DCF. For example, cellulose ether can be used as a thickener.

In some embodiments, binders can be used in a DCF to, for example, improve bonding to the substrate such as coal.

In some embodiments, a glycol can be used in a DCF to provide functional such as wet edge, open time, controlling drying time, and freeze/thaw stability.

In some embodiments, other rheology modifiers can also be used in conjunction with, or instead of, some of the above described compositions.

In some embodiments, fillers can be used in the DCF although a lower viscosity closer to that of water (for spraying purposes) is preferred. For example, calcium carbonate, calcium sulfate hemihydrates, or calcium sulfate dehydrated can all be used as fillers, though other materials can be used as well. Further, thickeners, preservatives, binders, and other additives can be incorporated into the DCF.

Other additives can also be added to the described DCF in addition to the asphalt emulsion. In some embodiments, metal siliconate salts such as, for example, potassium siliconate, as well as silicone based compounds such as, for example, poly hydrogen methyl siloxane and polydimethyl siloxane, could provide advantageous water resistance to a DCF. In some embodiments, fluorinated compounds and stearate-based salts could also be used to provide advantageous water resistance.

Embodiments of the DCF can be applied in thin layers to a surface. The DCF can be applied by, for example, using a spraying device. However, the application and thickness of the layers of DCF is not limiting. Further, multiple layers may be applied in order to obtain an appropriate dust control. The number or layers applied is not limiting. In some embodiments, each layer can be allowed to dry prior to application of the next layer. In some embodiments, a second layer can be applied when the first layer is only partially dried.

In some embodiments, the DCF can be aqueous. In addition to a latex binder, other water soluble binders, such as polyvinyl alcohol, can be used as well. Other materials, such as talc, binders, fillers, thickening agents, preservatives, limestone, perlite, urea, defoaming agents, gypsum latex, glycol, and humectants can be incorporated into the DCF as well or can substitute for certain ingredients (e.g., talc can be used in place of, or in addition to mica; gypsum can be used in place of, or in addition to calcium carbonate, etc.). In some embodiments, the calcium carbonate can be replaced either wholly or partially with a surface micro-roughened filler that can further enhance the DCF's hydrophobicity. In some embodiments, Calcimatt™, manufactured by Omya AG, can be used. In some embodiments, cristobalite (silicon dioxide) such as Sibelite® M3000, manufactured by Quarzwekre, can be used. These fillers can be used alone or in combination.

In some embodiments, the DCF is aqueous and can be applied to the substrate and can be allowed to dry. Once the water evaporates from the mixture, a dry, relatively hard cementitious material can remain.

Table 1 describes a coal dedusting formulation which is made as 4% solution and sprayed on to coal railcars.

TABLE 1

Asphalt Emulsion

| Content | Density (lbs/gallon) | Volume (Gallons) | Weight (lbs) | Dosage (Wt. %) |
|---|---|---|---|---|
| Defoamer | | | 4.9 | 0.0001 |
| Low CVS Emulsifier | 8.4 | 2690 | 22,596 | 48 |
| Asphalt Blend | 7.85 | 3179 | 24,955 | 52 |
| Total | | | 47,556 | 100 |

Table 2 described the CVS emulsifier that is a component of the asphalt emulsion.

TABLE 2

Low CVS Emulsifier

| Content | Density (lbs/gallon) | Volume (Gallons) | Weight (lbs) | Dosage (Wt. %) |
|---|---|---|---|---|
| Water | 8.34 | 1403 | 11,701 | 60 |
| Tetrasodium pyrophosphate | | | 171 | 0.01 |
| Vinsol solution | 8.73 | 400 | 3492 | 17.5 |
| Defoamer | 7.68 | 3.93 | 30 | 0.003 |
| Clay slurry | 8.69 | 501 | 4354 | 22.5 |
| Potassium hydroxide | 12.18 | 0.5 | 6 | 0.0002 |
| Total | | | 19754.0 | 100 |

TABLE 3

Clay Slurry

| Content | Density (lbs/gallon) | Volume (Gallons) | Weight (lbs) | Dosage (wt.) |
|---|---|---|---|---|
| Water | 8.34 | 1120 | 9341 | 89.4 |
| Bentonite clay | | | 1000 | 9.6 |
| Potassium oxalate | | | 107 | 1 |
| Total | | | 10,447.8 | 100 |

Similarly, Table 4 describes an alternative formulation of the asphalt emulsion that can be used for coal dedusting.

TABLE 4

Alternative embodiment of asphalt emulsion

| Content | Weight % |
|---|---|
| Water | 48.5 |
| Asphalt blend | 38.73 |
| Bentonite clay | 4.15 |
| Phosphoric acid | 0.05 |
| Preservative | 0.1 |
| Wollastonite | 0.36 |
| Kaolin clay | 8 |
| Total | 100 |

Suitable bases include any compound that is capable of saponifying the ester carboxylate group, or deprotonating the carboxylic acid proton. Suitable bases are inorganic basis such as potassium hydroxide and ammonium hydroxide. Likewise, suitable organic basis are monoethanol amine, diethanol amine, ad triethanol amine.

In some embodiments, the DCF can provide water repellency. One indication of water repellency is the contact angle of a water droplet on the surface of the dried DCF. A water droplet surface that has a contact angle of less than 90 degrees would generally be considered hydrophilic (the smaller the contact angle the greater the hydrophilicity). Conversely, surfaces that cause a water droplet to have a contact angle greater than 90 degrees are generally considered hydrophobic. Commercially available ready mix DCF have contact angles of about zero degrees, meaning that a drop of water placed on such a surface will rapidly spread and wet out on the surface. Embodiments of the disclosed DCF can have a contact angle greater than about 60, 70, 80, 90, 100, 110, 120, or 130. In some embodiments, the DCF can have a contact angle between about 60 and 130, about 115 and 130, or about 118-120. Embodiments of the disclosed DCF, containing an asphalt emulsion, can have an average contact angle of about 98 degrees (based on an average of six measurements), or greater than about 98 degrees, indicating a hydrophobic surface.

In some embodiments, the contact angle can be between about 60 to about 110 degrees, or about 60, about 70, about 80, about 90, about 100, or about 110 degrees.

In some embodiments, the contact angel can be any number selected from the following numbers in degrees: 60, 61, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, and 130.

From the foregoing description, it will be appreciated that inventive devices and approaches for low-dust/water resistant products and asphalt emulsions have been disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination as well as in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the Drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying Drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using and medical applications for the same will be apparent to those of skill in the art. Accordingly, it should be understood that various applications, modifications, materials, and substitutions can be made of equivalents without departing from the unique and inventive disclosure herein or the scope of the claims.

What is claimed:

1. A method for controlling dust on a surface of a bulk material, comprising:
   (I) preparing a dust control formulation (DCF) comprising a dust reduction additive (DRA) emulsion comprising:
      (i) asphalt,
      (ii) at least one first defoamer, and
      (iii) at least one emulsifier,
         wherein said at least one emulsifier is a low-fatty acid emulsifier comprising:
         (a) water,
         (b) a fatty acid solution,
         (c) a base, and
         (d) a stabilizer and
   (II) applying said dust control formulation to said surface of said bulk material in an amount effective for dust control.

2. The method as recited in claim 1, wherein said dust control formulation is applied by sprinkling, and/or a spray nozzle.

3. The method as recited in claim 1, wherein said dust control formulation further comprises a first water.

4. The method as recited in claim 1; wherein said asphalt in said DRA is from about 30% to about 70% by weight of the DRA.

5. The method as recited in claim 1; wherein said asphalt in said DRA is from about 30% to about 70% by weight of the DRA; wherein said at least one first defoamer in said DRA is from about 0.00005% to about 0.00030% by weight of the DRA; and wherein said at least one emulsifier in said DRA is from about 30% to about 70% by weight of the DRA.

6. The method as recited in claim 1, wherein said asphalt in said DRA is an asphalt blend.

7. The method as recited in claim 1, wherein said DCF further comprises a binder; a preservative; a rheology modifier; and/or a surfactant.

8. The method as recited in claim 1, wherein said dust-reduction additive emulsion further comprises a second water; a base; and a dispersant.

9. The method as recited in claim 1, wherein the weight of said dust reduction additive emulsion is in the range of from about 0.01% to about 20% by weight of said dust control formulation.

10. The method as recited in claim 1, wherein the weight of said dust reduction additive emulsion is in the range of from about 0.1% to about 10% by weight of said dust control formulation.

11. The method as recited in claim 1, wherein said dust control formulation is applied to the surface of said bulk material at the rate of from about 0.001 to about 5.0 gallon per square yard for controlling dust.

12. The method as recited in claim 1, wherein said bulk material is coal, limestone, fly ash, cement, carbon black, coke, or mineral material.

13. The method as recited in claim 1, wherein said bulk material is coal, and said dust control formulation is applied the top of said coal load in an open-topped, coal-hopper railcar, used for transporting coal.

14. The method of claim 1, wherein the base of the DRA includes potassium hydroxide.

15. The method of claim 1, wherein the base of the DRA includes ammonium hydroxide.

16. The method of claim 1, wherein the DRA further comprises abietic acid.

17. The method of claim 1, wherein the stabilizer of the DRA includes ethylene-vinyl acetate-vinyl alcohol terpolymer.

18. The method of claim 1, wherein the DRA further comprises a suspension agent.

19. The method of claim 1, wherein the DRA further comprises a second defoamer.

20. The method as recited in claim 18, wherein said suspension agent is a clay slurry.

* * * * *